(12) United States Patent
Villbrandt et al.

(10) Patent No.: US 12,000,429 B2
(45) Date of Patent: Jun. 4, 2024

(54) MODULAR EDGE CLIP

(71) Applicant: HELLERMANNTYTON GmbH, Tornesch (DE)

(72) Inventors: Ute Villbrandt, Henstedt-Ulzburg (DE); Björn Schiwek, Tornesch (DE)

(73) Assignee: HELLERMANNTYTON GmbH, Tornesch (DE)

( * ) Notice: Subject to any disclaimer, the term of this patent is extended or adjusted under 35 U.S.C. 154(b) by 54 days.

(21) Appl. No.: 17/932,358

(22) Filed: Sep. 15, 2022

(65) Prior Publication Data

US 2023/0092063 A1 Mar. 23, 2023

(30) Foreign Application Priority Data

Sep. 17, 2021 (DE) .......................... 202021105021.7

(51) Int. Cl.
*F16B 5/06* (2006.01)
*F16B 2/24* (2006.01)

(52) U.S. Cl.
CPC .............. *F16B 5/0635* (2013.01); *F16B 2/24* (2013.01)

(58) Field of Classification Search
CPC .......... F16B 5/0635; F16B 2/24; F16B 5/121; F16B 5/0685; F16B 2/08; F16B 2/12
See application file for complete search history.

(56) References Cited

U.S. PATENT DOCUMENTS

| | | | | |
|---|---|---|---|---|
| 1,030,386 A | * | 6/1912 | Comeau | A41F 11/02 24/598.5 |
| 3,137,027 A | * | 6/1964 | Birkle | A47H 13/01 24/456 |
| 3,214,810 A | * | 11/1965 | Mathison | A41F 1/00 24/562 |

(Continued)

FOREIGN PATENT DOCUMENTS

CN 203309368 11/2013
CN 105346484 2/2016

(Continued)

OTHER PUBLICATIONS

"Extended European Search Report", EP Application No. 22196052.9, Jan. 24, 2023, 5 pages.

*Primary Examiner* — Robert Sandy
*Assistant Examiner* — Rowland Do
(74) *Attorney, Agent, or Firm* — Colby Nipper PLLC (57) ABSTRACT

Disclosed are apparatuses and techniques relating to modular edge clips for fastening a fastening element to an edge of an object. In an aspect, a modular edge clip includes first and second edge clip modules. The edge clip modules include retaining elements and latching connection elements. The respective latching elements having latching claws which, in collaboration with the other edge clip module serve as a counter-bearing, are designed to latch the modular edge clip onto the edge. The latching connection elements for connecting the respective edge clip modules to one another by way of a latching connection. The edge clip modules, in a (Continued)

state connected by the latching connection elements, form a gap between the respective latching elements, into which the edge of the object can be inserted in an insertion direction in order to fasten the edge clip to the edge.

20 Claims, 3 Drawing Sheets

(56) References Cited

U.S. PATENT DOCUMENTS

| | | | | |
|---|---|---|---|---|
| 4,641,475 | A * | 2/1987 | Berridge | E04D 3/366 52/584.1 |
| 5,539,963 | A * | 7/1996 | Fujiwara | B42F 1/006 24/67.5 |
| 10,316,991 | B2 | 6/2019 | Gallion | |
| 10,851,820 | B2 | 12/2020 | Spearing | |
| 2008/0229550 | A1 | 9/2008 | Elsner | |
| 2010/0199463 | A1 | 8/2010 | Kudo | |
| 2012/0124782 | A1 * | 5/2012 | Elsner | B60R 16/0215 24/115 A |
| 2013/0092803 | A1 * | 4/2013 | Fujiwara | H02G 3/32 248/74.2 |
| 2017/0114809 | A1 * | 4/2017 | Stickelberger | F16B 5/0635 |
| 2020/0173470 | A1 * | 6/2020 | Binkert | F16B 5/125 |
| 2020/0208662 | A1 * | 7/2020 | Spearing | F16B 5/121 |

FOREIGN PATENT DOCUMENTS

| | | |
|---|---|---|
| CN | 105351631 | 2/2016 |
| CN | 106439237 | 2/2017 |
| DE | 102010007256 | 8/2011 |
| DE | 102018127519 | 5/2020 |
| EP | 3341638 | 7/2018 |
| FR | 1110957 | 2/1956 |
| FR | 2601086 | 1/1988 |
| WO | 2003016726 | 2/2003 |

* cited by examiner

Fig. 14

MODULAR EDGE CLIP

INCORPORATION BY REFERENCE

This application claims priority to German Patent Application Number DE202021105021.7, filed Sep. 17, 2021, the disclosure of which is incorporated by reference in its entirety.

BACKGROUND

Various types of edge clips, which can also be referred to as edge clamps, are known from the prior art for fastening one or more articles to an edge of an object. Such edge clips are typically composed of two parts, namely an outer plastic part and an inner metal part. The outer plastic part usually has a retaining element, such as a loop or eyelet for example, for fastening the fastening element, for example a cable tie, to the edge clip and thus indirectly for fastening the article (s), for example a cable bundle, to the edge. Alternatively, the fastening element may also be cast with the outer plastic part and therefore may be directly part of the edge clip. The inner metal part is generally inserted into the outer part in the form of a U-shaped metal clamp and is latched to the outer part. The U-shaped metal clamp has, on the inner sides of the legs, which form a gap into which the edge of the object can be inserted in order to fasten the edge clip to the edge, a plurality of latching claws which are bent upwards when the edge is inserted in an insertion direction and which, when pulled counter to the insertion direction, are anchored in the gap in such a way that the object cannot be removed without considerable effort, which is often associated with the edge clip being destroyed. Such edge clips are known for example from CN105351631A, CN105346484A, CN106439237A, CN203309368U, or US2010/199463A1.

One disadvantage of the previous solutions is that specific applications, for example different thicknesses of the objects, which are often metal sheets, or different requirements with regard to the positioning of the fastening element on the edge clip relative to the edge, in each case require individually developed and produced edge clips in order to reliably retain, on the object, the fastening element and thus indirectly also the article to be fastened to the edge of the object by the fastening element.

The problem addressed is therefore that of overcoming the previous disadvantages and providing, with little effort, an edge clip suitable which can be used in a flexible manner to reliably fasten a fastening element to an edge of an object.

SUMMARY

This problem is solved by the subjects of the independent claims. Advantageous embodiments will emerge from the dependent claims, the description, and the figures.

One aspect relates to a modular edge clip for fastening a fastening element, such as a cable tie for example, to an edge of an object, such as a metal sheet for example. A modular edge clip can be understood here to mean an edge clip of modular construction, which has various modules of different module types, wherein the modules of different module types can be combined with one another, in the present case connected to one another, via uniform mechanical interfaces, as embodied below by a latching connection element.

Accordingly, the present edge clip has a first edge clip module of a first module type and a second edge clip module of a second module type that differs from the first module type. The first edge clip module has a retaining element, for example a loop or eyelet for said cable tie, for fastening the fastening element to the edge clip module. The fastening element may also be part of the edge clip module, for example by forming the retaining element in one piece with the fastening element. By way of example, the retaining element may take the form of a base which is cast with the cable tie and which then, together with the cable tie, is part of the first edge clip module. The first edge clip module additionally has a latching element, the first latching element, having at least two latching claws which, in collaboration with the second edge clip module that serves as a counter-bearing, are designed to latch or fix and thus fasten the edge clip to the edge of the object. The first edge clip module also has a latching connection element, the first latching connection element, for connecting the first edge clip module to the second edge clip module by way of a latching connection.

Correspondingly, the second edge clip module likewise has a latching element, the second latching element, having at least two latching claws which, in collaboration with the first edge clip module that serves as a counter-bearing, are designed to latch or fix and thus fasten the edge clip to the edge, and a latching connection element, the second latching connection element, designed as a counterpart to the first latching connection element (the latching connection element of the first edge clip module), for connecting the first edge clip module to the second edge clip module by way of the latching connection. The respective latching elements may also be referred to as gripping elements. The respective latching connection elements may be designed in the manner of a latching plug-and-socket connection, it being irrelevant which of the two latching connection elements is the plug (or male latching connection element) and which is the socket (or female latching connection element). Depending on the nature of the intended use of the edge clip, the latching connection that can be established by the latching connection elements should be sufficiently stable and as free of play as possible. In particular, the latching connection may be or may include a latching connection that cannot be released without using tools and/or a latching connection that cannot be released without being destroyed. To increase the stability of the connection between the two edge clip modules, the two edge clip modules can be joined together materially in addition to the latching connection, in particular at the latching connection elements, in particular by sonotrode welding (ultra-sonic welding).

When the two edge clip modules are connected by the latching connection elements, that is to say in the latched-together state of the two edge clip modules, a gap is formed between the respective latching elements, into which the edge of the object can be inserted at least partially, that is to say partially or entirely, in an insertion direction in order to fasten the edge clip to the edge as intended. Preferably, the latching elements of the different edge clip modules are thus arranged in a manner corresponding to the legs of the known U-shaped metal clamps and also perform the associated function known from the prior art.

This construction has the advantage that, by suitably selecting the respective edge clip modules, the edge clip can be quickly adapted to the respective application, for example to different thicknesses of the edge or of the object and/or different types of fastening elements and/or different positions of the fastening elements relative to the edge of the object, namely by respectively selecting different edge clip modules suitable for the respective application and combining them with one another, that is to say connecting them to one another by way of the latching connection elements.

Using the two separate latching elements means that it is not necessary for the U-shaped metal clamps known from the prior art to be individually adapted in each case to the specific application, in particular to the thickness of the edge, and thus to be produced separately using different tools. Instead, for the respective latching elements to function reliably, the type of edge clip module of the other latching element is irrelevant. In particular, the manufacture of the different metal clamps is associated with a significant development effort and outlay on materials, and therefore the advantages in this regard carry particular weight.

In one advantageous embodiment, it is provided that the edge clip modules each have a receiving element for receiving the respective latching element, wherein in particular the receiving element and the retaining element and the latching connection element of the first edge clip module and the receiving element and the latching connection element of the second edge clip module are in each case manufactured in one piece from a plastic, for example by means of an injection molding process.

The plastic may be or may include, for example, a glass-fibre-reinforced plastic. The receiving element and the retaining element and the latching connection element, and respectively the receiving element and the latching connection element, may in this case be part of a respective associated—for example U-shaped—edge clip module body. This has the advantage that the two edge clip modules can be produced particularly easily and can be adapted to the forces to be transmitted between the latching elements and the retaining element in the respective application by adapting the respective receiving elements.

It may accordingly be provided here that the latching elements each have at least one retaining element for retaining the latching element on the associated receiving element and thus in the rest of the edge clip module, wherein a main extension direction of the retaining element preferably extends along the insertion direction. In particular, the retaining element may be or may include a latching element, such as an eyelet for example, which is designed to receive a tongue of the associated receiving element. Since the main extension direction extends along the insertion direction, the retaining element predominantly extends parallel to occurring tensile forces, which are to be expected along the insertion direction when edge clips are being used in the usual way. The retaining elements may accordingly be dimensioned particularly precisely for the (low) forces necessary for retaining the latching element in the receiving element without any risk of the latching elements being broken off. The edge clip can therefore be produced in a particularly effective and efficient manner.

It may also be provided that the latching elements each have at least one guide element for guiding the latching element relative to the receiving element and thus the rest of the edge clip module, the respective main extension direction of which guide element preferably extends transversely to the insertion direction. In particular, the guide element may be or may include a tab, which engages in an opening of the receiving element, or alternatively or additionally also an eyelet, which accordingly receives a tongue of the associated receiving element. Since the main extension direction extends transversely to the insertion direction and thus transversely to the occurring forces to be expected, the forces can be transmitted over a particularly large surface area to the receiving element and thus to the rest of the edge clip. This therefore also enables particularly effective dimensioning of the bracket, wherein significant advantages are achieved particularly when using metal latching elements in combination with a receiving element made of plastic, since tensile forces that occur can thus be transmitted from the latching element to the rest of the edge clip in a particularly gentle manner.

The guide elements thus serve primarily for transmitting, from the latching element to the receiving element and vice versa, the forces that occur when the edge clip is used as intended for fastening the fastening element to the object, and are accordingly optimized in this regard. In contrast, the retaining elements serve primarily for retaining the latching element in or on the receiving element following pre-installation of the latching elements in the edge clip modules, so that the latching elements do not fall out of the receiving element and become lost prior to the final installation, that is to say prior to the edge being inserted into the gap between the latching elements. In addition, following the final installation, any play of the latching elements relative to the receiving elements can be reduced by the retaining elements. The at least one retaining element and the at least one guide element of an associated latching element are thus preferably elements which are different from one another and therefore independent of one another, which can be individually and thus efficiently adapted to the respective requirements.

In particular, a plurality of retaining elements and/or a plurality of guide elements may be provided per latching element, as a result of which the forces are even better distributed and a more precise and more reliable arrangement of the latching elements relative to the associated receiving elements is achieved. As an alternative or in addition to the retaining/guiding element(s), the latching elements may be cast with the receiving element.

In another advantageous embodiment, it is provided that at least one latching claw, that is to say one or multiple or all latching claws, of one or both latching elements has a respective fillet, in particular at a transition from a portion of the latching claw that protrudes out of a main extension plane of the respective latching element to another portion of the latching element that lies in the main extension plane or to another portion of the latching claw that lies in the main extension plane. This has the advantage that the latching claws have a higher strength, that is to say can transmit particularly large forces. The use of a fillet is possible in the known applications only with difficulty since the known U-shaped metal clamps can then no longer be inserted in the outer plastic shell.

In another advantageous embodiment, it is provided that the latching elements of the different edge clip modules are structurally identical, in particular having latching claws made of metal.

As an alternative or in addition, the latching elements may each be formed in one piece from a stamped and bent metal part, or may include such a part. Due to the structurally identical latching elements, which in the modular approach described here can also be used in different applications, the manufacturing effort is reduced, material is saved, and the scope of use of the latching elements and of the associated edge clips is increased. The use of metal increases the stability and at the same time increases the advantages achieved, since the corresponding advantages achieved in the modular approach are also particularly large due to the generally higher production costs.

In another advantageous embodiment, it is provided that the first edge clip module and/or the second edge clip module comprises at least one element for preventing penetration during transport, which is arranged at a mouth of the gap through which the edge of the object can be inserted in the insertion direction in order to fasten the edge clip to the edge, and/or is arranged in the gap, in particular in the form of one or more fingers which extend transversely to the insertion direction and thus prevent inadvertent insertion of cables for example, and resulting possible damage thereto, but also injury to a finger inadvertently inserted into the gap. The at least one element for preventing penetration during transport may accordingly have a respective pre-determined breaking point, for example at a base of the finger facing towards the rest of the edge clip module, so that, prior to the final installation, it can be easily pressed in, that is to say for example by a user without the need for tools, or removed by means of a knife. The latching claws are thus screened off from the surrounding environment, thereby reducing the risk of damage or injury. The at least one element for preventing penetration during transport is preferably made in one piece with the receiving element and the retaining element and the latching connection element of the first edge clip module or in one piece with the receiving element and the latching connection element of the second edge clip module.

In another advantageous embodiment, it is provided that at least one of the latching connection elements is designed as a multiple latching connection element with a latching connection subelement which, when the two edge clip modules are connected by the latching connection element, enables a latching in multiple different positions along a latching direction, which extends transversely to the main extension plane of the gap, so that different widths can be set for the gap according to the different positions. This has the advantage of making the edge clip more flexible since, depending on the application, a reliable fastening of the edge clip to the edge can already be achieved with one and the same combination of edge clip modules by a different depth of latching, that is to say simply a latching in different positions along the latching direction. Moreover, a respective width of the gap can thus also be adjusted only once the edge has been inserted into the gap, which is desirable for example in the case of a painted metal sheet as the object since a particularly gentle application of the edge clip to the edge is achieved.

A further aspect relates to an edge clip system including such an edge clip, comprising a plurality of different first edge clip modules (of respective different first module types) and/or a plurality of different second edge clip modules (of respective different second module types), wherein any of the first edge clip modules can be connected to and thus combined with any of the second edge clip modules by means of the respective latching connection elements. In particular, the edge clip system may comprise only one first edge clip module and a plurality of different second edge clip modules, or only one second edge clip module and a plurality of different first edge clip modules. The types refer to respective abstract categories the respective edge clip modules can be categorized into. The latching connection elements can thus be referred to as standardized and/or unified within the edge clip system. This has the advantage that, for different applications, respectively optimized edge clips can be created by the different combinations with particularly little effort.

In one advantageous embodiment, it is provided that the different first edge clip modules each have different retaining elements, which are each designed to fasten fastening elements of different types to the first edge clip modules and/or which are each arranged at different positions relative to the gap and thus the respective latching element. This has the advantage that, by virtue of the edge clip system, an edge clip that serves to fasten a fastening element of a specific type and/or in a specific application can be created with little effort.

In another advantageous embodiment, it is provided that the different first edge clip modules and/or the different second edge clip modules each have a different length of extension in a direction perpendicular to the main extension plane of the gap so that, by combining different edge clip modules of one edge clip module type with an edge clip module of the other module type that stays the same, gaps of different width can be formed when connecting the respectively combined first and second edge clip module by way of the latching connection elements. Preferably, the width of the gaps may vary in a range from 8 mm to 16 mm. The length of extension may in particular be measured starting from the latching element or the main extension plane of the latching element in the direction of the gap, that is to say in the direction in which the other edge clip module is located when the other edge clip module is installed. This has the advantage that specific edge clips, which are optimized for edges of different thickness, can be made available with little manufacturing effort.

It is particularly advantageous here if the different first edge clip modules each have different retaining elements and/or retaining elements at different positions relative to the gap, and only the different second edge clip modules each have a different length of extension in the direction perpendicular to the main extension plane of the gap in the aforementioned manner since, by deliberately varying in each case just one parameter, the desired edge clip can then be adapted to a single respective characteristic, namely the width of the gap and the type of fastening element and/or the position thereof relative to the gap. It has been found here that specifically these two parameters are important for most applications and thus are ideally represented separately in the product.

One aspect also relates to a first edge clip module and/or a second edge clip module of (or for) one of the described edge clips and/or one of the described edge clip systems. Correspondingly, the respective first/second edge clip module comprises the features described in the context of the complete respective edge clip that are relevant for the respective first/second edge clip module. Advantage and advantageous embodiments correspond here to the advantages and advantageous embodiments described for the edge clip and/or the edge clip system.

A further aspect relates to a method for pre-assembling a modular edge clip which is designed to fasten a fastening element to an edge of an object and has a first edge clip module and a second edge clip module. The method comprises respectively inserting a latching element having at least two latching claws into the respective rest of the edge clip module in a first direction relative to the rest of the edge clip module, connecting the respective latching elements to the respectively associated rest of the edge clip module, and establishing a latching connection between the two edge clip modules by sliding the two edge clip modules one into the other along a second direction relative to the respective edge clip modules. The first and/or the second direction extend transversely to a main extension plane of a gap between the edge clip modules, into which the edge of the object can be inserted in an insertion direction in order to fasten the edge clip to the edge.

Advantages and advantageous embodiments of the method correspond here to the advantages and advantageous embodiments described for the edge clip system or the edge clip and the respective edge clip modules.

In the context of the present disclosure, "transverse" and "along" can be understood to mean "substantially perpendicular" and "substantially parallel," respectively. Here, "substantially perpendicular" or "substantially parallel" means "perpendicular/parallel except for a specified deviation," wherein the specified deviation may be, for example, 2°, 5°, 10° or 15°.

The features and combinations of features mentioned in the above description, including in the introductory part, as well as the features and combinations of features mentioned below in the description of the figures and/or shown in the figures can be used not only in the respectively specified combination, but also in other combinations without departing from the scope of the invention. Thus, embodiments of the invention which are not explicitly shown in the figures and explained but which emerge from the explained embodiments by separate combinations of features, and which can be produced, are also to be regarded as included and disclosed. Embodiments and combinations of features which therefore do not contain all the features of an originally formulated independent claim are also to be regarded as disclosed. In addition, embodiments and combinations of features which go beyond or deviate from the combinations of features set out in the dependencies of the claims are to be regarded as disclosed, in particular by the embodiments discussed above.

BRIEF DESCRIPTION OF THE DRAWINGS

The subject matter according to the invention will be explained in greater detail with reference to the schematic drawings shown in the following figures, but without being limited to the specific embodiments shown here. In the drawings.

In the different figures, elements which are the same or which have the same function are provided with the same reference signs.

DETAILED DESCRIPTION

Figure 1:
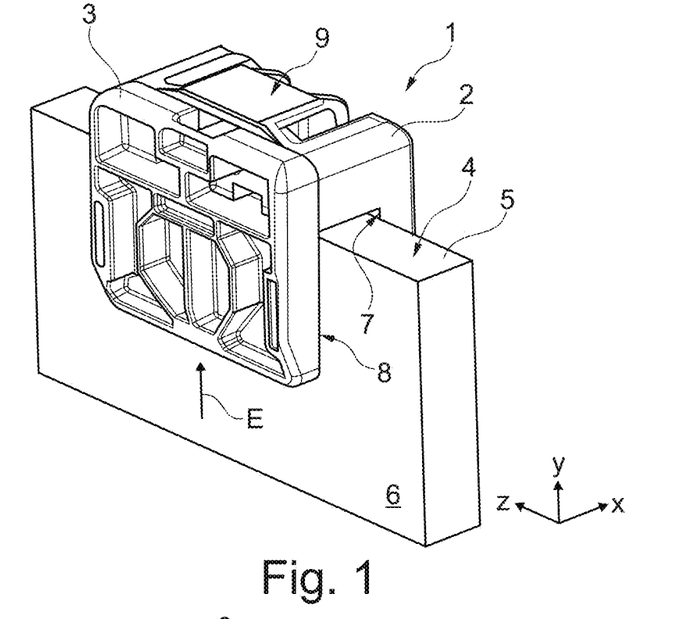
FIG. 1 shows view an example embodiment of a modular edge clip fastened to an edge of an example object, in a perspective view.

The present disclosure relates to an edge clip for fastening a fastening element (e.g., a cable tie) to an edge of an object (e.g., metal sheet). FIG. 1 shows a perspective view of an example modular edge clip 1 for fastening a fastening element to an edge 5 of an object 6. In the present case, the modular edge clip 1 comprises a first edge clip module 2 and a second edge clip module 3, which are connected to one another by way of a latching connection (not shown here). In the present case, an edge 5 of an object 6 is inserted into a gap 4, which is formed by the first edge clip module 2 and the second edge clip module 3 in a connected (and thus latched, as shown here) state, so that the inner sides of two cheeks 7, 8 of the edge clip 1, which bound the gap 4, are obscured in the present case. The insertion direction E, in which the edge 5 is inserted into the gap 4 when used as intended, coincides in the present case with the positive y-direction. In the present case, the main extension plane of the gap is the y-z plane.

In the example shown, a retaining element 9 for fastening the fastening element to the edge clip module 2 is arranged on the upper side of the first edge clip module 2, that is to say on the side thereof oriented in the positive y-direction. In the present case, the retaining element 9 takes the form of a multiple eyelet, into which a cable tie can be inserted from different directions and thus fastened.

Figure 2:
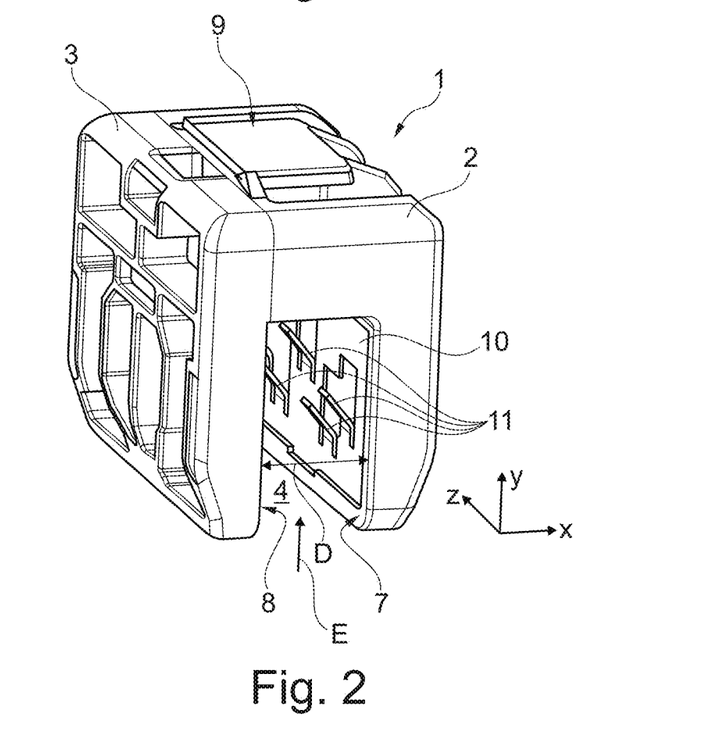
FIG. 2 shows the edge clip of FIG. 1 in an unfastened state, with no object inserted, in a further perspective view.

FIG. 2 shows the example edge clip 1 of FIG. 1 without the edge 5 inserted into the gap 4. The cheek 7 of the first edge clip module 2 is therefore now also visible. An example latching element 10 having at least two, in the present case five, latching claws 11 is arranged on the cheek 7. As known from the prior art, once the object 6 has been inserted into the gap 4 in the insertion direction E, the latching claws 11 prevent the object from slipping out of the gap 4 counter to the insertion direction E, wherein the second edge clip module 3 serves as a counter-bearing or counter-support for the illustrated latching claws 11 of the latching element 10 of the first edge clip module 2. The second edge clip module 3 has a latching element of analogous design on its inner cheek 8.

Figure 3:
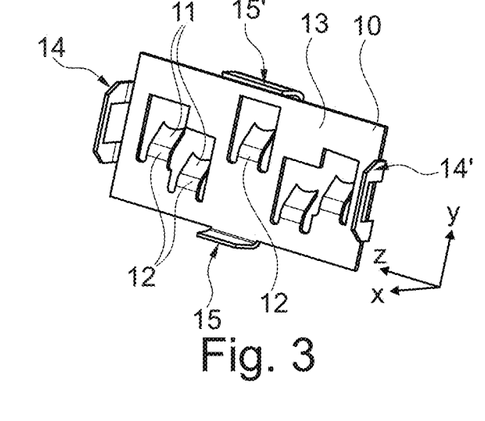
FIG. 3 shows an example embodiment of a latching element for a modular edge clip, in a perspective view.

FIG. 3 shows an example embodiment of the latching element 10 of FIG. 2. In the present embodiment, the latching element 10 is a stamped and bent metal part which has a plurality of, in the present case five, latching claws 11. In the present case, the main extension plane of the latching element 10 is the z-y plane, out of which the latching claws 11 protrude here in the negative x-direction. In the present case, the latching claws 11 have respective fillets 12, here at a transition between the portion of the latching claws 11 that protrudes out of the main extension plane and the rest of the latching element 10, which in the present case still includes a base of the latching claws 11. The portion of the latching element 10 that lies in the main extension plane can also be referred to as a carrier 13. In the present case, this carrier 13 has a rectangular shape for example. In the example shown, respective retaining elements 14, 14', which in the present case are stamped out as a latching element in the form of an eye and are bent out of the main extension plane, are mounted at two opposite ends of the carrier 13 and thus of the latching element 10. These are designed to retain the latching element 10 on the rest of the edge clip module 2, in particular the receiving element 16 which will be further explained in FIG. 4. In the present case, the main extension direction of the retaining elements 14, 14' extends along the y-direction.

In the example shown, the latching element 10 also has respective guide elements 15, 15' at other opposite ends of the carrier 13 and thus of the latching element 10. In the present case, these are implemented in the form of tabs bent out of the main extension plane. The guide elements 15, 15' are designed to transmit to the rest of the edge clip module 2, in as gentle a manner as possible, forces which are applied to the latching element 10 parallel to the insertion direction E, that is to say in the positive or in particular negative y-direction. In the present case, therefore, the guide elements 15, 15' have a main extension direction which extends in the z-direction transversely to the insertion direction E. In the example shown, the two guide elements 15, 15' are of different length in their main extension direction, which, as can be seen from FIG. 4, is an installation aid to prevent incorrect orientation when pre-installing the latching element 10 in the first or second edge clip module 2, 3.

Figure 4:
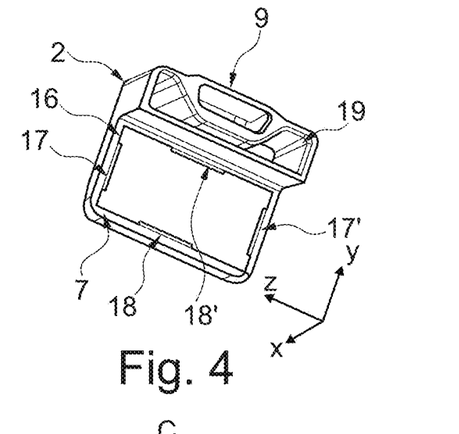
FIG. 4 shows an example embodiment of a first edge clip module, shown without the latching element, in a perspective view.

FIG. 4 shows the first edge clip module 2 without the latching element 10. In the example shown, a receiving element 16, which is intended to receive the latching element 10, has respective cutouts 17, 17' and 18, 18' formed on the corresponding expanses in a manner corresponding to the retaining elements 14, 14' and the guide elements 15, 15'.

Since the first edge clip module 2 is shown in isolation, the latching connection element 19 for connecting the first edge clip module 2 to the second edge clip module 3 is now also visible. In the present case, it has a tunnel-like cutout, into which the corresponding connection element 20 (FIG. 7), comprising a slide-like protrusion, can be inserted and latched. So, in the present example, the latching connection element 19 us a female latching connection element and the corresponding connection element 20 is a male latching connection element.

Figure 5:
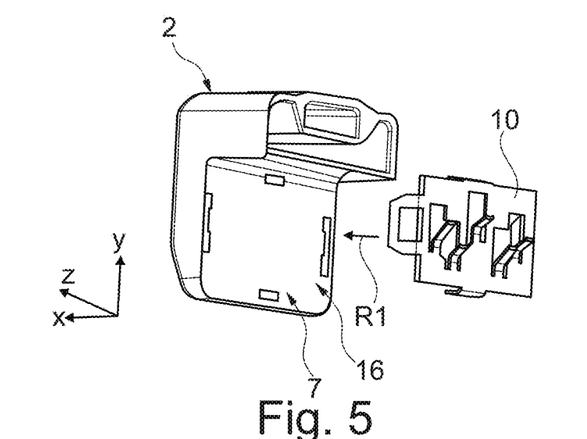
FIG. 5 shows the insertion of the latching element of FIG. 3 into the edge clip module of FIG. 4 along a first direction, in a perspective view.

FIG. 5 now shows the insertion of the latching element 10 into the receiving element 16 and thus into the rest of the first edge clip module 2 along a first direction R1 relative to the rest of the edge clip module 2. Since the insertion of the latching element 10 can take place in the absence of the second edge clip module 3, the freedom in terms of the design of the latching element 10 with the corresponding retaining and guiding elements 14, 14', 15, 15' and the latching claws 11 is particularly great.

Figure 6:
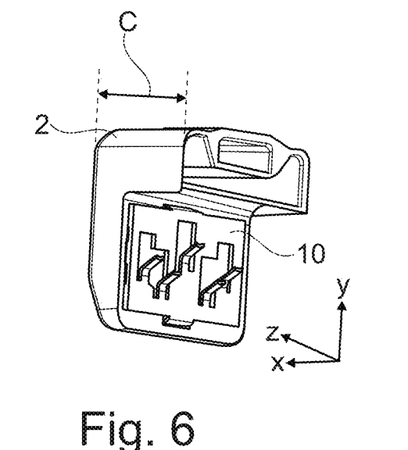
FIG. 6 shows the pre-assembled first edge clip module according to FIGS. 3 to 5, in a perspective view.

FIG. 6 shows in a corresponding manner the first edge clip module 2 of FIG. 5 with the latching element 10 inserted and fastened by the retaining elements 14, 14'. Said latching element thus has a total length of extension C perpendicular to the main extension plane of the gap 4.

Figure 7:
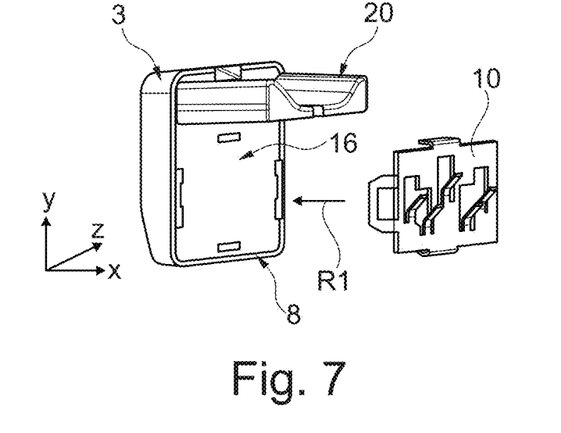
FIG. 7 shows the insertion of the latching element of FIG. 3 into an example embodiment of a second edge clip module along the first direction, in a perspective view.

FIG. 7 shows, in a manner corresponding to FIG. 5, the insertion of the latching element 10, which in the present case is structurally identical for both edge clip modules 2, 3, in the first direction R1 relative to the rest of the edge clip module 3.

Figure 8:
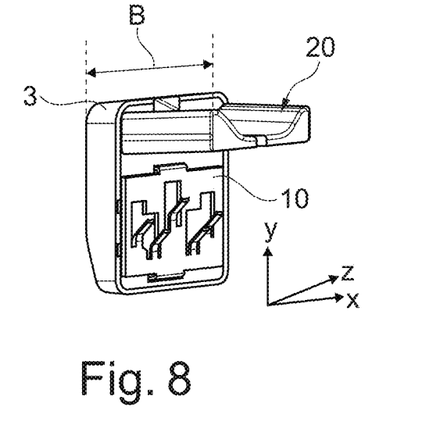
FIG. 8 shows the pre-assembled second edge clip module according to FIG. 7, in a perspective view.

FIG. 8 shows the resulting complete second edge clip module 3 with the latching element 10 inserted and connected as well as the further latching connection element 20 designed as a counterpart to the latching connection element 19 of the first edge clip module 2, here comprising a slide-like protrusion in the positive x-direction. In the present case, the second latching connection element 20 can thus also be described as a latching plug, which is inserted and latched into the latching connection element 19 as if into a socket.

Figure 9:
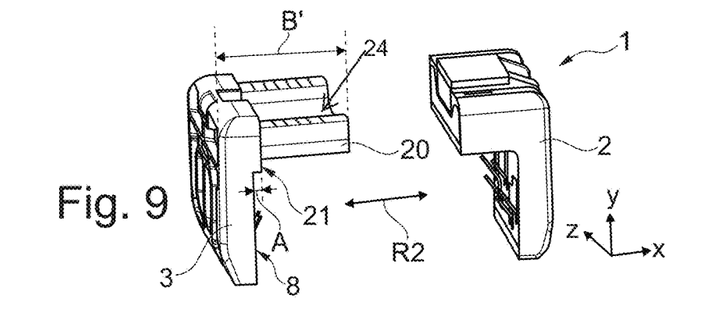
FIG. 9 shows the connection of the two edge clip modules of FIG. 6 and FIG. 8 by sliding one into the other along a second direction, in a perspective view.
Figure 10:
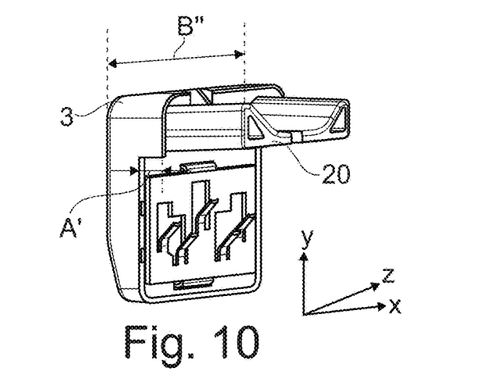
FIG. 10 shows another example embodiment of a first edge clip module, in a perspective view.
Figure 11:
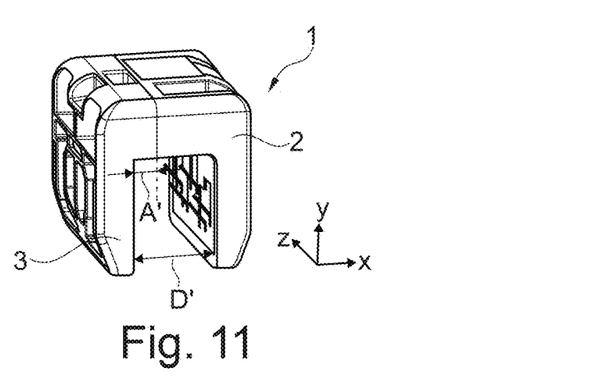
FIG. 11 shows an example edge clip comprising the second edge clip module of FIG. 10 and the first edge clip module of FIG. 9, in a perspective view.
Figure 12:
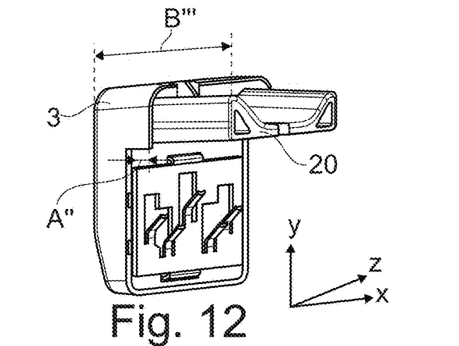
FIG. 12 shows another example embodiment of a first edge clip module for a larger gap, in a perspective view.
Figure 13:
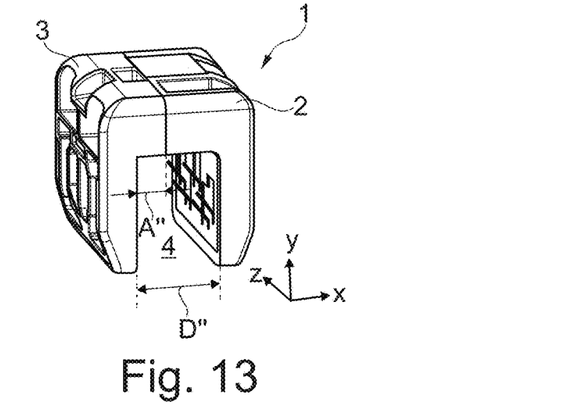
FIG. 13 shows an example edge clip comprising the second edge clip module of FIG. 12 and the first edge clip module of FIG. 9, in a perspective view.

FIG. 9 shows that the two edge clip modules 2, 3 can be pushed one into the other along a second direction R2 and can be latched together by establishing a latching connection so as thus to form a ready-to-use edge clip 1. In the present case, the illustrated second edge clip module 3 has in the x-direction, that is to say in a direction perpendicular to the main extension plane of the gap 4, a length of extension B' which is greater than the corresponding length of extension B of the second edge clip module of FIG. 8. This is achieved in that, in the example shown, the latching connection element 20 is arranged on a base 21, which has the thickness A in the x-direction starting from the cheek 8 and thus the main extension plane of the latching element 10. Therefore, without modifying the latching connection element 20, the thickness D of the gap 4 can be adjusted by suitably selecting the thickness A of the base 21. Alternatively or in addition, a length of the (male) latching connection element 20 can be varied in the shown example to vary the length of extension B' and thus adjust the thickness D of the gap 4. The thickness of the gap 4 may be adjusted or adjustable in a range from 8 mm to 16 mm.

In the example shown, the first direction R1 and the second direction R2 are the same, that is to say parallel. However, other embodiments are also conceivable in which this is not the case. In particular, the latching connection elements 19, 20 may also be designed in such a way that the second direction R2 extends transversely to the first direction R1, preferably in the z-direction.

In the present example, the latching connection element 20 is provided with a latching connection subelement 24 which, when the two edge clip modules 2, 3 are connected by the latching connection elements 19, 20, enables a latching in multiple different positions along the latching direction R2 so that different widths can be set for the gap 4 according to the different positions.

FIGS. 10 to 13 correspondingly show different second edge clip modules 3, the length of extension B, B', B", B'" of which is in the x-direction perpendicular to the main extension plane of the gap 4, and thus the thickness D, D', D" of said gap, can be adapted by varying the thickness A, A', A" of the base 21, without having to modify the corresponding latching connection element 20 of the second edge clip module 3. One and the same first edge clip module 2, that is to say a first edge clip module 2 of a single first type, can therefore be combined with different second edge clip modules 3 of respective different second edge clip module types—here the module types having the different lengths of extension B, B', B", B'"—and in this way an edge clip 1 suitable for various uses can be made available with little manufacturing effort. The selected solution using bases 21 of different bulk can also be produced in a particularly efficient manner, namely by using a modular injection mold for the second edge clip module.

In a manner analogous to varying the second edge clip module 3 by different module types, as shown here, the first edge clip module 2 can also advantageously be varied, which accordingly may have, for example, not just one retaining element 9 in the form of an eyelet, but instead also differently designed retaining elements 9 in the different edge clip module types, or else, for example, respective retaining elements which, in the different edge clip module types, may be formed at other positions of the edge clip module 3 relative to the gap 4.

Figure 14:
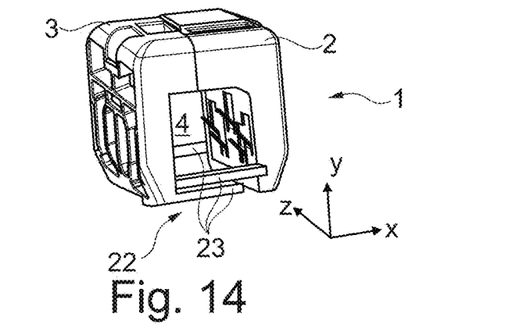
FIG. 14 shows another example embodiment of an edge clip module comprising another example embodiment of a second edge clip module, in a perspective view.

Finally, FIG. 14 shows another example embodiment of an edge clip 1. The edge clip 1 in said figure has, at a mouth 22 of the gap 4, a plurality of elements 23 for preventing penetration during transport, which prevent any inadvertent insertion of articles, for example cables or human fingers, into the gap 4 and thus reduce the risk of injury and/or damage in the uninstalled state of the edge clip 1. In the present case, the elements 23 for preventing penetration during transport are designed as fingers on the second edge clip module 3, which protrude in the direction of the other edge clip module 2. The elements 23 for preventing penetration during transport can be selected in terms of their thickness and thus stability in such a way that either they can either be removed with a knife shortly before final installation of the edge clip 1, or else they can even simply be broken off by the object 6 if the installation pressure is of sufficient magnitude.

What is claimed is:

1. A modular edge clip configured for fastening a fastening element to an edge of an object, the modular edge clip comprising:
    a first edge clip module, the first edge clip module comprising:
        a first retaining element for fastening the fastening element to the first edge clip module;
        a first latching element having at least two first latching claws, the first latching element configured to collaborate with a second edge clip module that serves as a counter-bearing to latch the modular edge clip onto the edge; and
        a first latching connection element for connecting the first edge clip module to the second edge clip module by way of a latching connection; and
    the second edge clip module, the second edge clip module comprising:
        a second latching element having at least two second latching claws, the second latching element configured to collaborate with the first edge clip module that serves as a counter-bearing to latch the modular edge clip onto the edge; and
        a second latching connection element, designed as a counterpart to the first latching connection element of the first edge clip module, for connecting the first edge clip module to the second edge clip module by way of the latching connection,
    wherein the first edge clip module and the second edge clip module, in a state connected by the first and second latching connection elements, form a gap between the respective first and second latching elements, into which the edge of the object can be inserted in an insertion direction in order to fasten the modular edge clip to the edge.

2. The modular edge clip according to claim 1, wherein the first and second edge clip modules each have a receiving element for receiving the respective latching element.

3. The modular edge clip according to claim 2, wherein the receiving element of the first edge clip module, the first retaining element, and the first latching connection element of the first edge clip module, and the receiving element of the second edge clip module and the second latching connection element of the second edge clip module are in each case manufactured in one piece from a plastic.

4. The modular edge clip according to claim 2, wherein the first and second latching elements each have at least one retaining element for retaining the respective latching element on the receiving element, the retaining element having a main extension direction of that extends along the insertion direction.

5. The modular edge clip according to claim 4, wherein the retaining element is or includes a third latching element, and wherein the third latching element is an eyelet.

6. The modular edge clip according to claim 2,
    wherein each of the first and second latching elements each have at least one guide element for guiding the respective latching element relative to the receiving element,
    wherein the main extension direction of the at least one guide element extends transversely to the insertion direction, and
    wherein the guide element is or includes a tab.

7. The modular edge clip according to claim 6, wherein the retaining element and the guide element of a latching element are in each case elements which are different from one another.

8. The modular edge clip according to claim 1, wherein at least one of the first or second latching claws of one of the first or second latching elements has a fillet.

9. The modular edge clip according to claim 8, wherein the fillet is located at a transition from a portion of the latching claw that protrudes out of a main extension plane of the respective latching element to another portion of the respective latching element that lies in the main extension plane.

10. The modular edge clip according to claim 1, wherein the first and second latching elements are structurally identical.

11. The modular edge clip according to claim 10, wherein the first and second latching claws are made of metal and are each formed in one piece from a stamped and bent metal part.

12. The modular edge clip according to claim 1, wherein at least one of the first edge clip module or the second edge clip module further comprises:
    at least one element for preventing penetration during transport at a mouth of the gap through which the edge of the object can be inserted in the insertion direction in order to fasten the modular edge clip to at least one of the edge or the gap.

13. The modular edge clip according to claim 12, wherein the element for preventing penetration is in the form of one or more fingers that extend transversely to the insertion direction.

14. The modular edge clip according to claim 1, wherein at least one of the first or second latching connection elements is designed as a multiple latching connection element with a latching connection subelement, which when the first and second edge clip modules are connected by the latching connection element, enables a latching in multiple different positions along a latching direction so that different widths can be set for the gap according to the different positions.

15. An edge clip system configured for fastening a fastening element to an edge of an object, the edge clip system comprising:
    a modular edge clip comprising a first edge clip module and a second edge clip module;
    the first edge clip module comprising:
        a first retaining element for fastening the fastening element to the first edge clip module;
        a first latching element having at least two first latching claws, the first latching element configured to collaborate with the second edge clip module that serves as a counter-bearing to latch the modular edge clip onto the edge; and a first latching connection element for connecting the first edge clip module to the second edge clip module by way of a latching connection; and the second edge clip module comprising:

a second latching element having at least two second latching claws, the second latching element configured to collaborate with the first edge clip module that serves as a counter-bearing, are designed to latch the modular edge clip onto the edge; and a second latching connection element, designed as a counterpart to the first latching connection element of the first edge clip module, for connecting the first edge clip module to the second edge clip module by way of the latching connection, wherein the first edge clip module and the second edge clip module, in a state connected by the first and second latching connection elements, form a gap between the respective first and second latching elements, into which the edge of the object can be inserted in an insertion direction in order to fasten the modular edge clip to the edge, wherein the edge clip system further comprises at least one of a plurality of different first edge clip modules or a plurality of different second edge clip modules, and wherein any of the first edge clip modules can be connected to any of the second edge clip modules by the respective latching connection elements.

16. The edge clip system according to claim 15, wherein the different first edge clip modules each have different retaining elements, and wherein at least one of:

the different retaining elements are designed to fasten fastening elements of different types to the first edge clip modules, or the different retaining elements are each arranged at different positions relative to the gap.

17. The edge clip system according to claim 16, wherein the different first or second edge clip modules each have a different length of extension in a direction perpendicular to a main extension plane of the gap so that, by combining different edge clip modules of one edge clip module type with an edge clip module of the other module type that stays the same, gaps of different width can be formed when connecting the respectively combined first and second edge clip module by way of the first and second latching connection elements.

18. The edge clip system according to claim 15, wherein the different first or second edge clip modules each have a different length of extension in a direction perpendicular to a main extension plane of the gap so that, by combining different edge clip modules of one edge clip module type with an edge clip module of the other module type that stays the same, gaps of different width can be formed when connecting the respectively combined first and second edge clip module by way of the first and second latching connection elements.

19. The edge clip system according to claim 15, wherein the different first edge clip modules each have at least one of different retaining elements or retaining elements at different positions relative to the gap, and only the different second edge clip modules each have a different length of extension in a direction perpendicular to a main extension plane of the gap.

20. A method for pre-assembling a modular edge clip that is configured to fasten a fastening element to an edge of an object and has a first edge clip module and a second edge clip module, the method comprising:

respectively inserting a latching element having at least two latching claws into a respective rest of the edge clip module in a first direction relative to the rest of the edge clip module;

connecting the respective latching elements to the respectively associated rest of the edge clip module; and establishing a latching connection between the first and second edge clip modules by sliding the first and second edge clip modules one into the other along a second direction relative to the respective edge clip modules, wherein at least one of the first direction or the second direction extend transversely to a main extension plane of a gap between the first and second edge clip modules, into which the edge of the object can be inserted in an insertion direction in order to fasten the modular edge clip to the edge.

* * * * *